(12) United States Patent
Muthiah

(10) Patent No.: US 11,284,125 B2
(45) Date of Patent: Mar. 22, 2022

(54) SELF-DATA-GENERATING STORAGE SYSTEM AND METHOD FOR USE THEREWITH

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/899,276

(22) Filed: Jun. 11, 2020

(65) Prior Publication Data

US 2021/0392383 A1 Dec. 16, 2021

(51) Int. Cl.
*H04N 21/218* (2011.01)
*H04N 21/234* (2011.01)
*H04N 21/6379* (2011.01)

(52) U.S. Cl.
CPC ....... *H04N 21/2181* (2013.01); *H04N 21/234* (2013.01); *H04N 21/6379* (2013.01)

(58) Field of Classification Search
CPC ............. H04N 21/2181; H04N 21/234; H04N 21/6379
See application file for complete search history.

(56) References Cited

U.S. PATENT DOCUMENTS

| 5,602,585 | A  | * | 2/1997  | Dickinson | H04N 5/374 348/155 |
|-----------|----|---|---------|-----------|--------------------|
| 7,643,056 | B2 | * | 1/2010  | Silsby    | G08B 13/19684 348/155 |
| 9,131,202 | B1 |   | 9/2015  | Espeset et al. | |
| 10,002,647 | B1 | * | 6/2018 | Vankayala | G11C 8/10 |
| 10,911,816 | B2 | * | 2/2021 | Sakai     | H04N 7/183 |
| 2002/0006163 | A1 | * | 1/2002 | Hibi    | G08B 13/19602 375/240.16 |
| 2003/0177255 | A1 | * | 9/2003 | Yun     | H04N 19/70 709/231 |
| 2004/0028137 | A1 | * | 2/2004 | Wyn-Harris | H04L 67/42 375/240.17 |
| 2004/0240546 | A1 |   | 12/2004 | Wells  | |
| 2006/0182357 | A1 | * | 8/2006 | Liu     | G08B 13/19669 382/239 |

(Continued)

FOREIGN PATENT DOCUMENTS

WO WO 2019/242528 A1 12/2019

OTHER PUBLICATIONS

"Reduce Bandwidth Consumption by GOP Settings, ACTi Corporation, Nov. 20, 2009, retrieved from https://www2.acti.com/support_old/Package/%7B6060C79F-2A5D-40A4-8837-16B835E3364.PDF" (Year: 2009).*

(Continued)

*Primary Examiner* — James R Sheleheda
(74) *Attorney, Agent, or Firm* — Crowell & Moring LLP

(57) ABSTRACT

A self-data-generating storage system and method for use therewith are provided. In one embodiment, a controller of the storage system is configured to receive a single video frame of video footage from a host; generate a plurality of video frames from an interpolation of the single video frame; and store the single video frame and the generated plurality of video frames in the memory. Other embodiments are provided.

20 Claims, 7 Drawing Sheets

(56) References Cited

U.S. PATENT DOCUMENTS

| | | | |
|---|---|---|---|
| 2007/0024707 A1* | 2/2007 | Brodsky | G11B 27/28 348/143 |
| 2007/0280294 A1* | 12/2007 | Hunt | H04N 19/103 370/485 |
| 2007/0296817 A1 | 12/2007 | Ebrahimi et al. | |
| 2010/0246669 A1* | 9/2010 | Harel | G06F 11/1004 375/240.02 |
| 2010/0265344 A1 | 10/2010 | Velarde et al. | |
| 2010/0283857 A1* | 11/2010 | Gopinath | G08B 13/19669 348/152 |
| 2010/0315550 A1 | 12/2010 | Yokoyama | |
| 2013/0057719 A1* | 3/2013 | Aoyama | H04N 5/772 348/222.1 |
| 2013/0321623 A1* | 12/2013 | Roskowski | H04N 7/18 348/143 |
| 2019/0069008 A1 | 2/2019 | Sauer et al. | |

OTHER PUBLICATIONS

International Search Report completed Apr. 21, 2021 for International Application No. PCT/US2021/016321.

Written Opinion completed Apr. 21, 2021 for International Application No. PCT/US2021/016321.

Israel Patent Office Search Strategy completed Apr. 21, 2021 for International Application No. PCT/US2021/016321.

U.S. Appl. No. 16/708,091, filed Dec. 9, 2019, entitled "Storage System and Method for Video Frame Segregation to Optimize Storage."

* cited by examiner

SELF-DATA-GENERATING STORAGE SYSTEM AND METHOD FOR USE THEREWITH

BACKGROUND

Some hosts have a video camera (or are connected to a video camera) and send video data to the storage system for storage in its memory. The host can operate in a constant-bit-rate mode (which can provide constant quality but can take up a lot of space in the memory) or a variable-bit-rate mode (which can take up less space but is of variable quality).

DETAILED DESCRIPTION

Overview

Figure 1A:
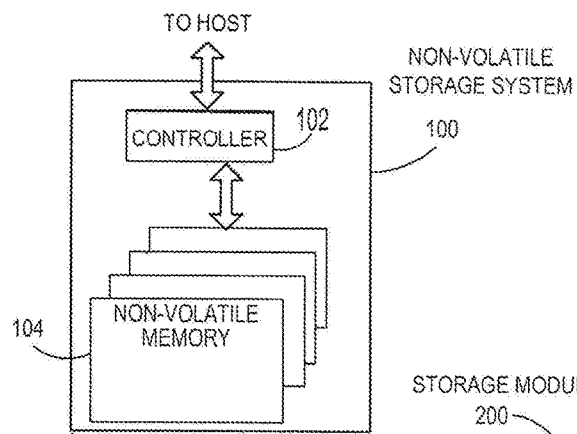
FIG. 1A is a block diagram of a non-volatile storage system of an embodiment.

By way of introduction, the below embodiments relate to a self-data-generating storage system and method for use therewith. In one embodiment, a storage system is provided comprising a memory and a controller. The controller is configured to receive a single video frame of video footage from a host; generate a plurality of video frames from an interpolation of the single video frame; and store the single video frame and the generated plurality of video frames in the memory.

In some embodiments, the single video frame and the generated plurality of video frames are stored together as a stream.

In some embodiments, the controller is further configured to perform video encoding on the stream. In some embodiments, the controller is further configured to add a time stamp to the stream.

In some embodiments, the plurality of video frames comprises a group of pictures.

In some embodiments, the controller is further configured to generate the plurality of video frames by creating an instantaneously decodable frame (IDR) and interpolating the plurality of video frames from the IDR.

In some embodiments, the controller is further configured to generate the plurality of video frames in response to a request to read the single video frame.

In some embodiments, the memory comprises a three-dimensional memory.

In another embodiment, a method is provided that is performed in a host in communication with a storage system comprising a memory. The method comprises determining whether motion in a video is less than a threshold for a certain amount of time; and in response to determining that motion in the video is less than the threshold for the certain amount of time, sending a seed video frame from the video to the storage system, wherein the storage system is configured to interpolate a plurality of video frames from the seed video frame.

In some embodiments, the method further comprises in response to determining that the motion in the video is not less than the threshold for the certain amount of time, enter into a different mode.

In some embodiments, the different mode comprises a variable bit rate mode.

In some embodiments, the different mode comprises a constant bit rate mode.

In some embodiments, at least one of the threshold and certain amount of time is configured to meet a quality of service requirement.

In some embodiments, the video comprises a surveillance video.

In another embodiment, a storage system is provided comprising a memory; means for receiving a single video reference frame from a host; means for generating a group of pictures comprising a plurality of video frames interpolated from the single video reference frame; and means for storing, in the memory, a stream comprising the group of pictures.

In some embodiments, the storage system further comprises means for performing video encoding on the stream.

In some embodiments, the storage system further comprises means for adding a time stamp to the stream.

In some embodiments, the group of pictures is generated by creating an instantaneously decodable frame (IDR) from the video reference frame and interpolating the plurality of video frames from the IDR.

In some embodiments, the storage system further comprises means for generating the plurality of video frames in response to a request to read the single video reference frame.

In some embodiments, the means for generating comprises an encoder.

Other embodiments are possible, and each of the embodiments can be used alone or together in combination. Accordingly, various embodiments will now be described with reference to the attached drawings.

Embodiments

Figure 1B:
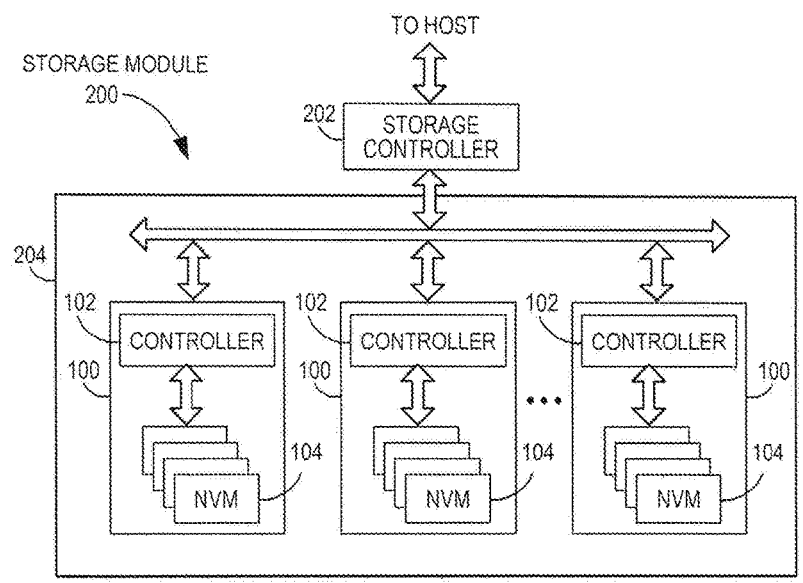
FIG. 1B is a block diagram illustrating a storage module of an embodiment.
Figure 1C:
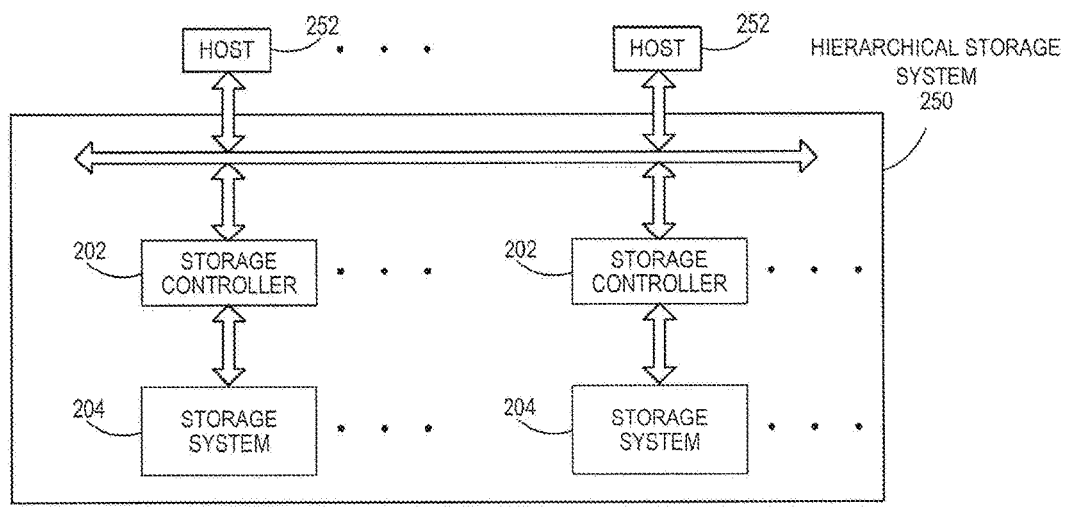
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
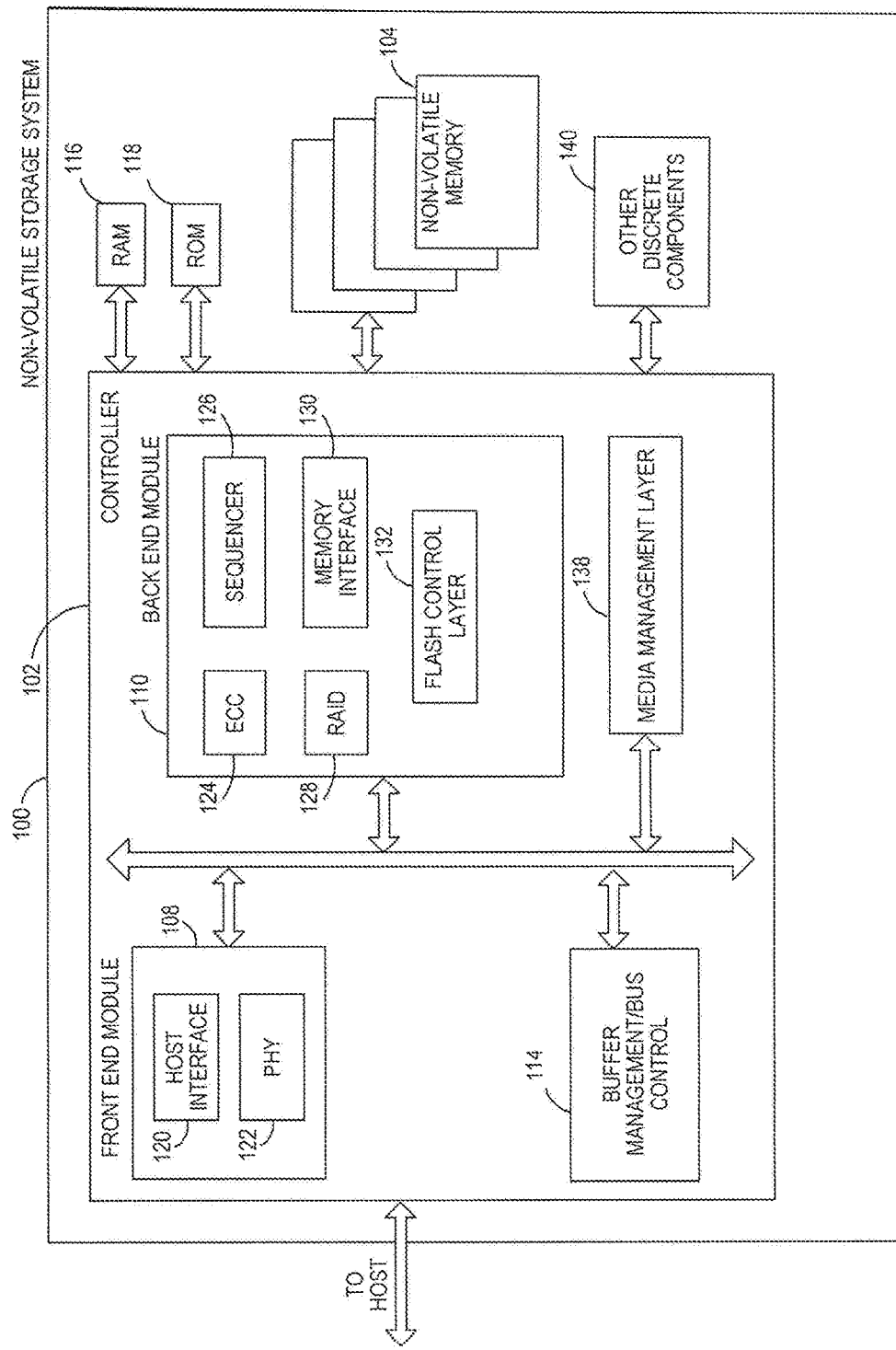
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
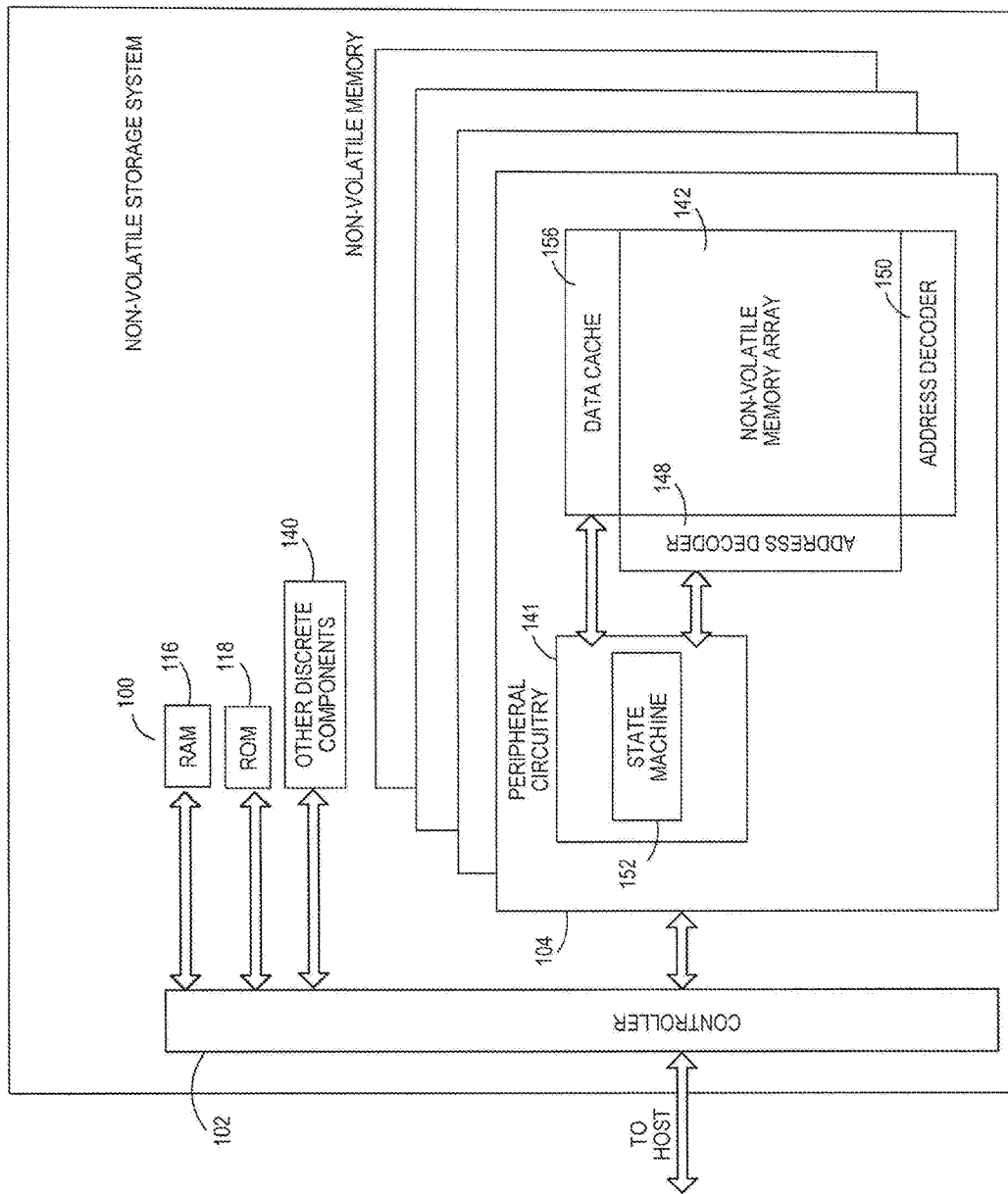
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
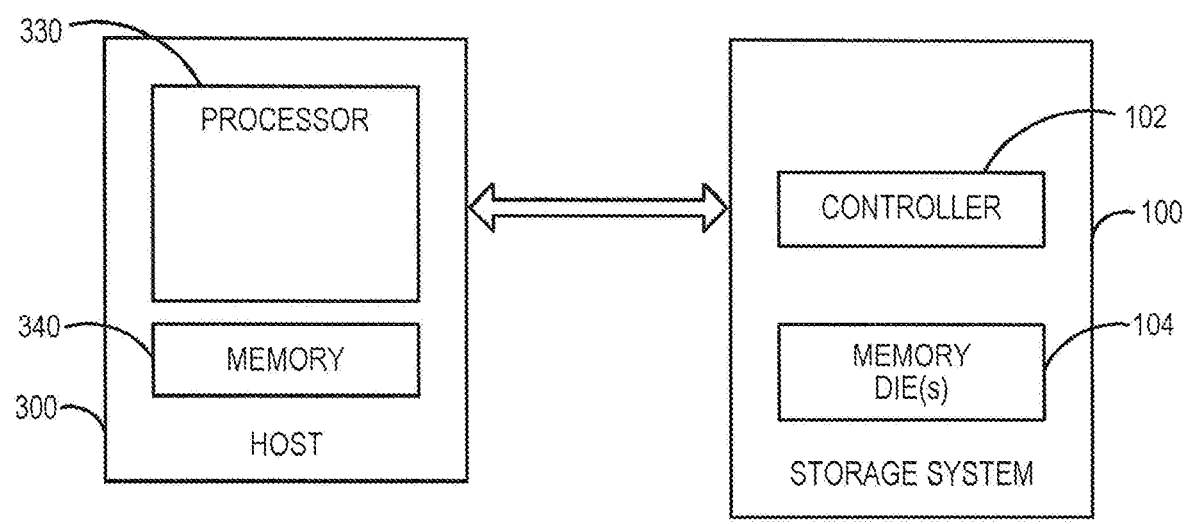
FIG. 3 is a block diagram of a host and storage system of an embodiment.

Turning again to the drawings, FIG. 3 is a block diagram of a host 300 and storage system (sometimes referred to herein as a "device") 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to read data from and write data to the storage system 100, as well as perform at least the functions described herein 100.

As mentioned above, some hosts have a video camera (or are connected to video camera) and send video data to the storage system for storage in its memory. Media streaming consumes enormous network bandwidth, and with multiple channels of media, the network bandwidth is usually the bottleneck. The low-cost/high-volume segment of surveillance systems requires only an acceptable quality of service (QoS). With low-cost systems, low network bandwidth consumption improves the value addition. One way to achieve constant network bandwidth is to use a constant-bit-rate (CBR) mode (which ensures constant video quality but can take up a lot of space in the storage system) or a variable-bit-rate (VBR) mode (which can take up less space but is of variable quality).

Figure 4:
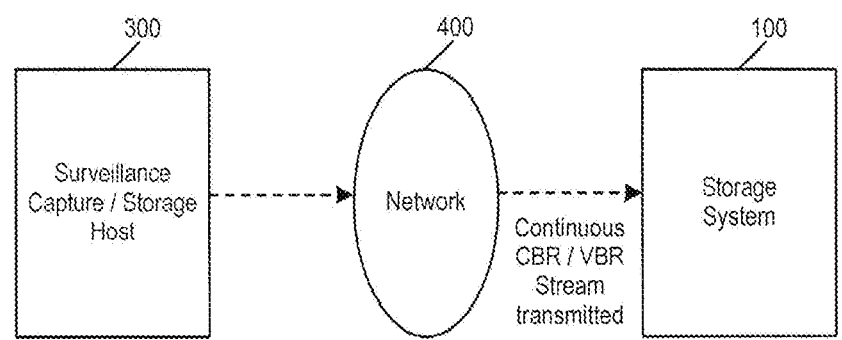
FIG. 4 is a block diagram of a surveillance system of an embodiment.

Such a system is shown in FIG. 4. As shown in FIG. 4, a host 300 is in communication with the storage system 100 via a network 400. A continuation stream us transmitted from the host 300 to the storage system 100. That is, the network connection is always on irrespective of the motion in the video. So, even when VBR mode is used to reduce network bandwidth, network bandwidth is still consumed. That is, while VBR mode can be used to save network bandwidth to some extent, it may not be optimum with certain use cases, such as where there is literally no motion for a long duration of time, which can often happen when recording video in a surveillance environment. Consider, for example, a surveillance system used to monitor a bank locker overnight. During that time (e.g., 16 hours), all the frames of the video are expected to be exactly or almost the same, unless a break-in occurs. CBR mode would not be preferred in this situation, as there is no reason to trade off bandwidth for quality. But even if VBR mode is used, there would still be a continuous stream of the same video being sent to the storage system 100.

Figure 5:
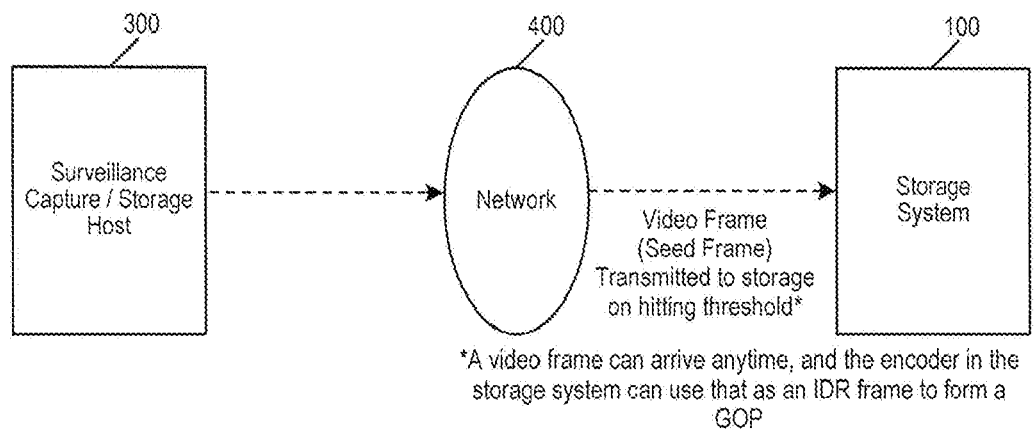
FIG. 5 is a block diagram of a surveillance system of an embodiment in which a host sends a video frame seed to a storage system.

The following embodiments can be used to address this issue and minimize the network bandwidth (thereby, also minimize cost and power consumption) in surveillance systems. An example implementation of this embodiment is illustrated in FIG. 5. It should be noted that this is merely an example, and other implementations can be used.

In this example, the host 300 determines if motion in a video is less than a threshold for a certain amount of time, both of which can be configured to meet a quality of service requirement. If it is, instead of streaming the same video continuously to the storage system 100 (which is sometimes referred to herein as the "device"), which would be a waste of bandwidth, the host 300 stops streaming the data to the storage system 100 and instead provides just a single video frame (which is sometimes referred to herein as a seed, reference, or golden frame) to the storage system 100. The controller 102 in the storage system 100 generates a plurality of video frames from an interpolation of the single video frame and stores the resulting group of picture (GOP) as a stream in the memory 104. The controller 102 can perform any suitable method to generate a plurality of video frames from an interpolation of the single video frame. For example, in one embodiment, the controller 102 (e.g., implementing an encoder) can create an instantaneously decodable frame (IDR) and interpolate the plurality of video frames from the IDR. That is, the storage system 100 can use a seed frame sent by the host 300 to create an IDR frame, on top of which a group of picture (GOP) is further interpolated.

So, in this embodiment, even though only a single video frame was sent to the storage system 100, the storage system 100 would store an entire stream of the video. In this way, the storage system 100 can be considered to be in a "self-data generation mode." The controller 102 of the storage system 100 can also perform other actions to the stream, just as if it were a typical video stream from the host 300, such as, but not limited to, perform video encoding on the stream or add a time stamp to the stream. For example, the storage system 100 can use the seed frame as a reference or base frame, add delta/padded frame fillers on its own, perform video encoding of the resulting stream, add a Moving Picture Experts Group (MPEG) time stamp, and subsequently store the resulting MPEG stream in the memory 104. In this way, upon retrieval from the storage system 100, the stream would be MPEG-compatible with playback systems.

This process can continue until the host 300 determines that the motion in the video is not less than the threshold for the certain amount of time. So, on next threshold hit, another seed frame is sent to the storage system 100, and the above process is repeated. The host 300 can send reference frames at an interval it deems fit or only when the motion is back to more than a threshold. However, if the motion in the video is not less than the threshold for the certain amount of time, the host 300 can enter into a different mode, such as a variable bit rate mode (VBR) or a constant bit rate (CBR) mode. So, the host 300 can, upon detecting an increase above a threshold in motion in a scene, cut short this mode and return back to one of the typically-used modes (e.g., VBR or CBR).

Figure 6:
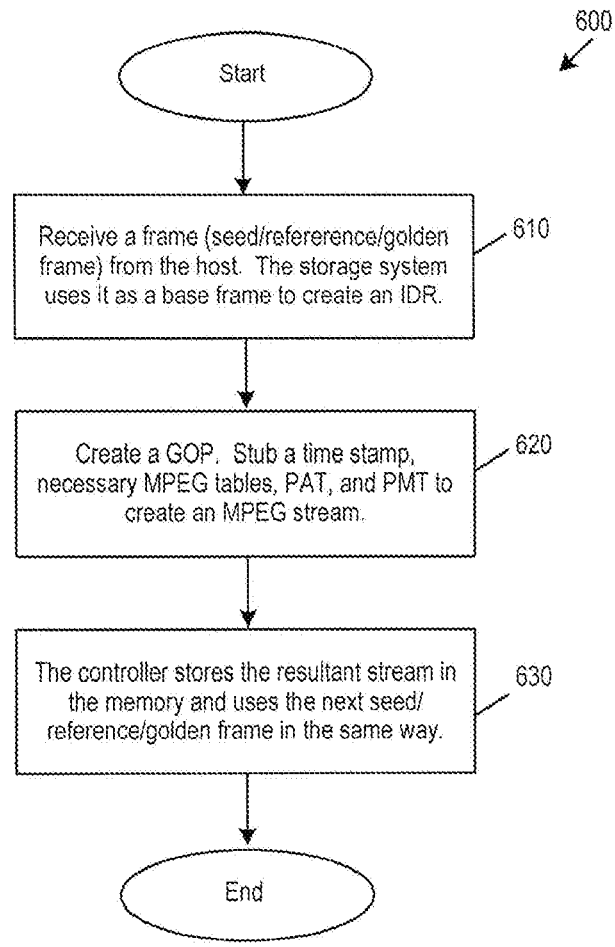
FIG. 6 is a flow chart of a method of an embodiment for generating a plurality of video frames from an interpolation of a single video frame.

FIG. 6 is a flow chart 600 that illustrates one method that uses this embodiment. As shown in FIG. 6, the controller 102 of the storage system 100 receives the seed frame from the host 300 and uses it as a base frame to create an IDR (act 610). The controller 102 then creates a group of pictures (GOP) and creates an MPEG stream (act 620). The controller 102 can do this, for example, by stubbing a time stamp, necessary MPEG tables, a program association table (PAT), and program mapping table (PMT). The controller 102 then stores the resultant stream in the memory 104 and processes the next seed frame the same way (act 630).

In summary, these embodiments can be used to avoid continuous streaming of data from the host 300 to the storage system 100, thereby minimizing power and network bandwidth usage. The motion threshold can be configured to meet a quality of service requirement, and these embodiments can allow trading off network bandwidth and power usage to meet a quality of service. Because a continuous network connection is not required in these embodiments, these embodiments are beneficial where the path/interface between the host 300 and storage system 100 is disconnected. This necessarily means that the network traffic is reduced, and the power required to perform data transfer is also reduced. The gains are even more pronounced when the storage system 100 is geographically separated from the surveillance region, such as in cloud-based video surveillance. The entire task of adding required delta frame fillers, adding time stamp values, and creating a compatible MPEG stream consistent with standards or recommendation is performed by the compute storage. Adding fillers/self-generated data enhances backward compatibility for other storage hosts, which expect proper MPEG transport stream (TS) formatting while retrieving data. Network bandwidth is saved by streaming only one frame of video over a longer period and allowing the device to fill the rest on its own. The quality of service may be lower than the typical systems as fillers are self-generated rather than camera passed.

There are many alternatives that can be used with these embodiments. For example, in the above implementation, the controller 102 of the storage system 100 performed the interpolation upon receiving the single video frame from the host 300. This can provide a compatibility advantage. For example, in a typical playback system, the host writing the data may not be the only party later retrieving it. In order to make sure that the stream is playable by all connected hosts and to make sure that there is no expectation from all parties to reconstruct on their own, the storage system 100 can perform interpolation and build the stream when it receives the reference frame. However, in an alternate embodiment, the storage system 100 can just store the reference frame as-is when it is received from the host 300, and the interpolation (and the MPEG stub headers) can be performed later in response to a request to read the single video frame from the same or different host.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
      receive a single video frame of video footage from a host;
      create an instantaneously decodable frame from the single video frame;
      generate a plurality of video frames from an interpolation of the instantaneously decodable frame;
      store the single video frame, the instantaneously decodable frame, and the generated plurality of video frames as a video stream in the memory, wherein the video stream is not backwards compatible with other hosts; and
      modify the stream to make the stream backwards compatible with the other hosts.

2. The storage system of claim 1, wherein the controller is further configured to modify the stream by performing video encoding on the stream.

3. The storage system of claim 1, wherein the controller is further configured to modify the stream by adding a time stamp to the stream.

4. The storage system of claim 1, wherein the plurality of video frames comprises a group of pictures.

5. The storage system of claim 1, wherein the controller is further configured to generate the plurality of video frames in response to a request to read the single video frame.

6. The storage system of claim 1, wherein the memory comprises a three-dimensional memory.

7. The storage system of claim 1, wherein the controller is further configured to modify the stream by placing the stream in a Moving Picture Experts Group (MPEG) format.

8. The storage system of claim 1, wherein the controller is further configured to modify the stream by adding a program association table (PAT) to the stream.

9. The storage system of claim 1, wherein the controller is further configured to modify the stream by adding a program mapping table (PMT) to the stream.

10. The storage system of claim 1, wherein the controller is further configured to receive a full video stream from the host.

11. The storage system of claim 1, wherein the video footage comprises a surveillance video.

12. A method comprising:
performing the following in a storage system comprising a memory:
receiving a single video frame of video footage from a host;
creating an instantaneously decodable frame from the single video frame;
generating a plurality of video frames from an interpolation of the instanteously decodable frame;
storing the single video frame, the instantaneously decodable frame, and the generated plurality of video frames as a video stream in the memory, wherein the video stream is not backwards compatible with other hosts; and
modifying the stream to make the stream backwards compatible with the other hosts.

13. The method of claim 12, further comprising receiving a full video stream from the host.

14. The method of claim 13, wherein the full video stream comprises a variable bit rate.

15. The method of claim 13, wherein the full video stream comprises a constant bit rate.

16. The method of claim 12, wherein the single video frame meets a quality of service requirement.

17. The method of claim 12, wherein the video footage comprises a surveillance video.

18. The method of claim 12, wherein modifying the stream comprises performing video encoding on the stream.

19. The method of claim 12, wherein modifying the stream comprises adding a time stamp to the stream.

20. A storage system comprising:
a memory;
means for receiving a single video reference frame from a host;
means for creating an instantaneously decodable frame from the single video reference frame;
means for generating a group of pictures from an interpolation of the instantaneously decodable frame; and
means for storing the single video reference frame, the instantaneously decodable frame, and the generated group of pictures as a video stream in the memory, wherein the video stream is not backwards compatible with other hosts; and
means for modifying the stream to make the stream backwards compatible with the other hosts.

* * * * *